Patented Sept. 24, 1940

2,215,478

UNITED STATES PATENT OFFICE 2,215,478

MANUFACTURE OF CERAMIC DIELECTRICS

Werner Rath and Hans Handrek, Bad Klosterlausnitz, Germany, assignors to Porzellanfabrik Kahla, Kahla, Thuringia, Germany No Drawing. Application February 4, 1935, Serial No. 4,859. In Germany November 30, 1933

5 Claims. (Cl. 106—12)

Our invention relates to the manufacture of ceramic dielectrics of high dielectric constant for use in condensers and containing titanium dioxide. Although the high dielectric constant of titanium dioxide has been known for a long time and although it has already been proposed to utilise this material for the production of insulating materials, it has not hitherto been found possible to obtain, in an economical way, a valuable insulating material for high frequency insulation purposes with a small dielectric angle of loss and satisfactory insulating and other electrical properties. This has not hitherto been attained, either by producing ceramic materials containing titanium oxide, or by adding titanium compounds to mouldable artificial resin materials or glass.

According to the invention it is proposed to use the titanium oxide required, at least in part, in the form of chemically produced titanium dioxide. The raw material is worked by ceramic methods and finally sintered to shaped articles at temperatures above 1000° C. If desired the content of refractory material of high dielectric constant can be increased up to the limit at which it is still possible to work the material by ceramic methods and to sinter the shaped articles at temperatures which are attainable and controllable in practice. Surprisingly this is possible with some of said materials of high dielectric constant to such a degree that it is possible to work the pure materials without any addition of other substances. The reason is that the chemically produced titanium dioxide exhibits a certain plasticity which enables simple bodies to be prepared by pressing without any additives. By means of comparatively small quantities of additive the workability can be increased to such an extent that even articles which are ordinarily difficult to produce can be prepared with facility.

Also the sintering temperature of artifically produced pure titanium dioxide without any additive is not very high and with the use of small quantities of additive, the material can be brought to the firing temperature of Seger cone 14–15 which is customary in fine ceramics.

Additives which increase ceramic workability and enable sintering without alterations in configuration are china clay, ball clay, steatite and magnesium hydrate inter alia. At the same time these materials have the property of not affecting the dielectric loss factor of the ceramic product in a detrimental manner as would be the case for example with the use of additives containing alkali.

If it is desired to obtain materials of particularly high dielectric constant the addition of china clay, steatite and the like is entirely dispensed with. In this case, organic materials having a plasticising effect such as dextrine, starch, sugar solution and the like are added. The same method of making workable said refractory material of high dielectric constant may be employed if, for facilitating sintering, fluxes, preferably alkaline earth, metal compounds, are added to the material of high dielectric constant. Beryllium oxide, zinc oxide and manganese oxide, however, may likewise be employed as such additive fluxes.

If materials of high dielectric constants are to be obtained, it is desirable to use fluxes which at the same time increase the dielectric constant without increasing the dielectric loss. Examples of additives operative in this way are small quantities of lead compounds such as wulfenite or lead oxide. Also frequently mixtures of materials are added which in themselves cannot be regarded as fluxes for the refractory material of high dielectric constant but which in consequence of eutectic formation with one another become fluxes for example china clay and magnesia, china clay and steatite, china clay and brucite.

A particularly suitable method of rendering the material of high dielectric constant workable by ceramic methods resides in introducing titanium oxide in the form of a salt of a high molecular weight organic acid. In this case the organic part of the additive is consumed in the firing and the pure metallic oxide which increases the dielectric constant remains.

An example of materials of this kind is the addition of titanium soap to ground titanium oxide. The plastification is accomplished in particularly effective manner by adding titanium chloride to the ground titanium oxide, mixing thoroughly and thereupon adding alkali soap. There results a precipitation of titanium soap which deposits on the particles of the titanium oxide, surrounding them with an adhesive and plastic film. The water soluble alkali chloride which is obtained simultaneously is then removed by pressing and washing. In carrying out the process indicated, materials in the following proportions may be employed: 100 parts of titanium oxide, 5 parts of soft soap and 2.14 parts of a watery solution containing 15% titanium chloride. The titanium oxide is finely ground in the presence of about the same quantity of water. The suspension is thoroughly mixed with a liquid watery solution of the soft soap with a content of about 20% of soap. Then the above mentioned solution of titanium chloride is added. From the resulting product the water is removed down to a content of about 20-25% of the mass by means of a filter press. In order to further remove the alkali chloride the whole mass is suspended in water a second time (25-30% of water is sufficient for rendering the mass liquid) and pressed once more. This washing and pressing process is repeated until most of the soluble alkali has been removed. All of these steps may be carried out at normal temperature (about 20° C.).

The procedure just described for the chemical precipitation of a titanium compound which on ignition is converted to the dioxide, has the important advantage that it can be prepared in a high state of purity, as most if not all of the impurities can be made to remain in the aqueous liquor. With such chemically precipitated titanium compounds, condenser dielectrics of unusually low dielectric angle of loss can be manufactured.

During the firing operation titanium oxide in a particularly fine crystalline form is obtained after the burning of the soap and exerts a cementing action on the main component of the material, i. e., the larger titanium oxide particles of the initial material. In this way the recrystallisation leading to a dense body is facilitated so that a sintered body consisting only of titanium oxide is readily obtained.

The materials described above can be worked into shaped bodies by ceramic methods by wet or dry pressing by turning, drawing and casting. The shaped articles are then dried in the usual way and finally sintered at temperatures exceeding 1000° C. A firing temperature of 1500–1550° C. has been found to be suitable for titanium dioxide. As has already been mentioned the workability in the unfired condition and the sintering are materially facilitated by additions of materials free from alkali, for example oxides or silicates of the alkaline earth metals or of the earth metals. Naturally the additives must be chosen in accordance with the conditions imposed in respect of the dielectric constant which is to be attained and in accordance with the permissible dielectric angle of loss.

By the methods above described, there can be obtained dielectrics consisting of sintered bodies having a titanium dioxide content of at least 80% and even up to 100%.

If the ground composition of material is to be formed to small tubes by drawing the mass is rolled on a beating or plunging machine and formed to mass-pestles, from which the small tubes are made by drawing in piston operated extrusion presses.

The shaped articles are burnt in ceramic furnaces at temperatures of Seger cone 13 to Seger cone 15. The burning time which may be about 25 to 35 hours, is primarily chosen in accordance with the size of the furnaces employed and with the burning conditions thereof, and obviously with the properties of the body being burnt.

The content of titanium dioxide is proportioned in any particular case to the desired dielectric constant of the ceramic dielectric, and such dielectric constant can thus, in accordance with the invention, be varied within wide limits. A titanium-free ceramic dielectric having a dielectric constant of 6 acquires, for example by the addition of 20% titanium dioxide, a dielectric constant of about 10. As the titanium dioxide content is increased to practically 100% the dielectric constant of the ceramic dielectric increases to about 85.

In order to obtain at the same time as small a dielectric angle of loss as possible for the ceramic dielectric, it is desirable to produce the titanium compound employed for imparting the desired dielectric constant by chemical reaction, so that it is practically free from such materials (particularly alkali metal and iron oxide) as unfavorably influence the dielectric losses.

What we claim is:

1. The method of producing a ceramic dielectric, comprising depositing upon a suspension of ground titanium dioxide a percipitate of an organic titanium soap obtained by chemical precipitation, separating the solid mixture so produced from the suspending medium, pressing the mass into a form suitable for condenser dielectrics, and then sintering the shaped mass to a solid body, the proportions of the materials being such that the titanium dioxide comprises at least about 80% of the dielectric.

2. The method of producing a ceramic dielectric, comprising treating a suspension of finely ground titanium dioxide with an alkali soap and an aqueous solution of titanium chloride, filtering off the solid matter, washing the residue to remove alkali metal compounds, pressing the mass into the form of a condenser dielectric, and sintering the shaped mass in a ceramic furnace to the final solid dielectric body.

3. The method of producing a titanium-containing ceramic dielectric, comprising precipitating a titanium compound which is, at the most, only difficultly soluble in water from an aqueous solution of a titanium salt with the aid of a high molecular weight organic acid compound capable of forming a relatively plastic and insoluble titanium soap, shaping the precipitated mass into a form suitable for condenser dielectrics, and then sintering it into a solid body.

4. The method of producing a titanium-containing ceramic dielectric, which comprises treating an aqueous solution of a titanium compound with a high molecular weight organic acid compound capable of forming a relatively plastic and insoluble titanium soap, adding to a titanium-containing mass composed at least in part of such precipitated soap, an alkali-free fluxing agent in quantities up to about 20% of the total mass, shaping the mass into a form suitable for condenser dielectrics, and then sintering it to a solid body.

5. A process for the manufacture of a ceramic dielectric containing at least 80% of titanium dioxide, comprising suspending ground titanium dioxide in a solution of a titanium compound, treating the solution with a high molecular weight organic acid compound capable of precipitating a relatively plastic and insoluble titanium soap, said soap becoming deposited in large part upon the suspended dioxide particles, separating the solid mixture from the solution, shaping the mass into a form suitable for condenser dielectrics, and then sintering it into a solid body.

WERNER RATH.
HANS HANDREK.